(12) United States Patent
Marques Da Silva Macedo

(10) Patent No.: US 10,161,137 B2
(45) Date of Patent: Dec. 25, 2018

(54) PANEL MOUNTING SYSTEM, METHOD OF PROVIDING A FAÇADE LINING TO BUILDING, AND COMBINATION OF PARTS FOR USE IN A PANEL MOUNTING SYSTEM

(71) Applicant: Trespa International B.V., Weert (NL)

(72) Inventor: Isabel Maria Marques Da Silva Macedo, Weert (NL)

(73) Assignee: TRESPA INTERNATIONAL B.V., Weert (NL)

( * ) Notice: Subject to any disclaimer, the term of this patent is extended or adjusted under 35 U.S.C. 154(b) by 0 days.

(21) Appl. No.: 15/738,312

(22) PCT Filed: Jun. 29, 2016

(86) PCT No.: PCT/NL2016/050458
§ 371 (c)(1),
(2) Date: Dec. 20, 2017

(87) PCT Pub. No.: WO2017/007305
PCT Pub. Date: Jan. 12, 2017

(65) Prior Publication Data
US 2018/0216350 A1    Aug. 2, 2018

(30) Foreign Application Priority Data

Jul. 9, 2015    (NL) .................................... 2015129

(51) Int. Cl.
*E04F 13/08*    (2006.01)
*F24S 10/70*    (2018.01)
(Continued)

(52) U.S. Cl.
CPC ...... *E04F 13/0869* (2013.01); *E04F 13/0803* (2013.01); *E04F 13/0805* (2013.01);
(Continued)

(58) Field of Classification Search
CPC .... E04F 13/0869; E04F 13/0803; F24S 20/66
See application file for complete search history.

(56) References Cited

U.S. PATENT DOCUMENTS 6,079,170 A  *  6/2000  Slebos .................... F24D 3/125
                                                          52/220.1
8,341,917 B2 *  1/2013  Resso .................... E04D 3/366
                                                          52/741.4
(Continued)

FOREIGN PATENT DOCUMENTS

CH           707080 A2  *  4/2014  ............ F24F 5/0092
DE       30 17 487 A1    11/1980
(Continued)

*Primary Examiner* — Rodney Mintz
(74) *Attorney, Agent, or Firm* — Roberts & Roberts, LLP

(57) ABSTRACT

The invention relates to a panel-mounting system for the façade lining of a building, comprising a conduit for a fluid, elongate profiles configured to be fixed to a building wall, panels for forming the façade lining by fixing them onto the profiles, wherein for each of the profiles an elongate contact area is defined between the profile and a panel which is fixed to that profile. At least some profiles comprise an elongate metallic heat conductor which is connected to the profile, arranged for exchanging heat conductively, through the contact area, between fluid in the conduit and the at least one panel fixed to that profile. The invention also relates to a method of providing a façade lining to a building wall, using such a system, and to a combination of parts for use in such a system.

18 Claims, 1 Drawing Sheet

(51) Int. Cl.
 F24S 20/66 (2018.01)
 F24S 25/60 (2018.01)
(52) U.S. Cl.
 CPC .......... *E04F 13/0816* (2013.01); *F24S 10/70* (2018.05); *F24S 20/66* (2018.05); *F24S 2025/6003* (2018.05); *F24S 2025/6004* (2018.05); *Y02B 10/20* (2013.01); *Y02E 10/44* (2013.01)

(56) References Cited

U.S. PATENT DOCUMENTS 8,973,313 B2 * 3/2015 Bettiol .................. E04B 1/12
 137/357
2013/0333310 A1 * 12/2013 Damo .................. E04C 2/521
 52/173.3

FOREIGN PATENT DOCUMENTS

DE 30 19 388 A1 11/1981
EP 0 082 213 A1 6/1983

* cited by examiner

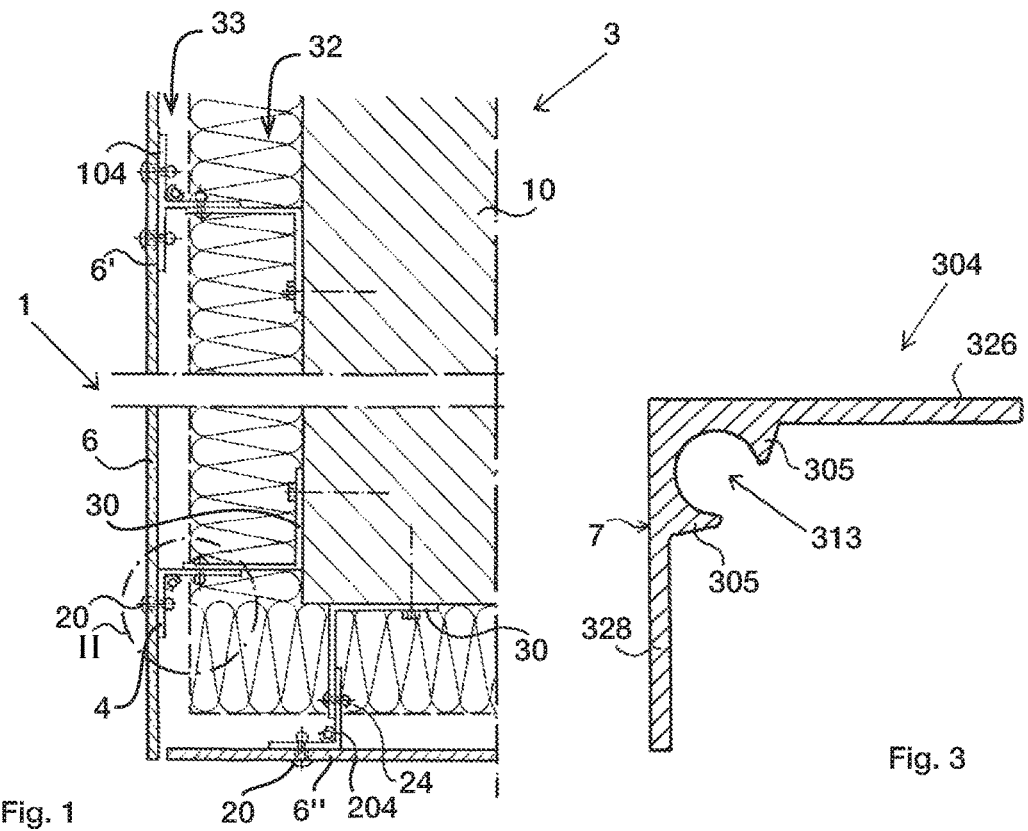
Fig. 1
Fig. 3
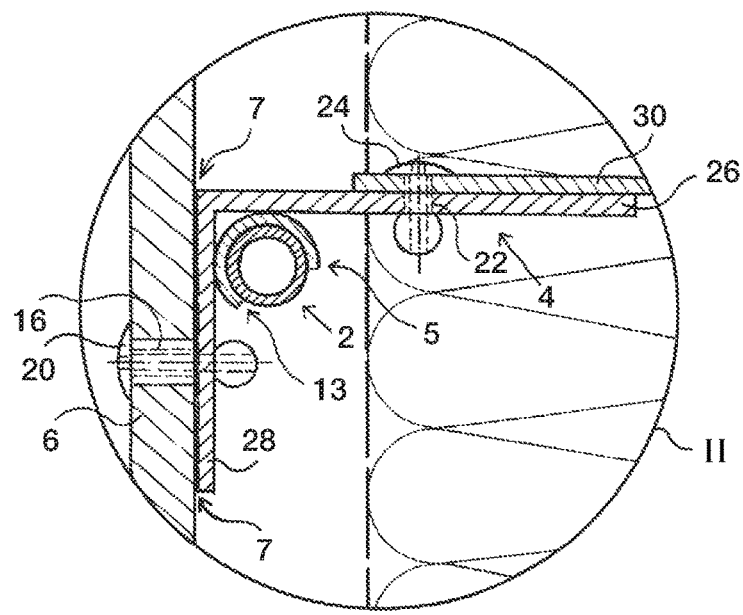
Fig. 2

PANEL MOUNTING SYSTEM, METHOD OF PROVIDING A FAÇADE LINING TO BUILDING, AND COMBINATION OF PARTS FOR USE IN A PANEL MOUNTING SYSTEM

The invention relates to a panel-mounting system for the façade lining of a building.

The invention further relates to a method of providing a façade lining to a building wall using such a panel-mounting system.

The invention further relates to a combination of parts for use in such a system.

DE 20 2011 050 389 U1 discloses a façade panel for a solar façade for heating a liquid by using the heat of a panel when radiated by the sun. The panel contains a tube connected to the backside of the panel using a heat transfer plate. The transfer plate clampingly holds the tube and clampingly abuts the backside of the panel such that the tube is in direct contact with the panel. The tube contains a heat transfer medium. A façade lining of a building wall is constructed by attaching panels to a building wall. The process of mounting such façade panels to a building wall so as to result in a solar façade is cumbersome.

It is an object of the invention to provide a panel mounting system, whereby the process of mounting the system to a building wall is relative simple.

In a first aspect the invention provides a panel mounting system for the façade lining of a building as claimed in claim 1, the panel mounting system comprising:
  a conduit for a fluid,
  a plurality of elongate profiles which are each configured to be fixed to a wall of the building,
  a plurality of panels for forming the façade lining of the building by fixing the plurality of panels onto the plurality of profiles, wherein for each of the profiles an elongate contact area is defined between the profile and at least one panel of the plurality of panels which is fixed to that profile, which contact area extends along at least substantially the length of the profile,
wherein at least some of the profiles of the plurality of profiles comprise an elongate metallic heat conductor which is connected to the profile, which extends at least substantially along the length of the profile, and which is arranged for exchanging heat conductively, through the contact area, between fluid in the conduit and the at least one panel fixed to that profile.

The panel mounting system in accordance with the first aspect of the invention is configured such that the conduit is part of the profiles via which the panels are mounted to the building wall. Therefore no additional space is required in width direction of the wall. Before the mounting of the panels, the conduit is therefore easily accessible, making assembly of the system including the conduit less cumbersome, while the conduit is hidden from view by the panels after mounting the panels onto the profiles.

Preferably, the conduit is formed by a tube that is in use connected to the heat conductor of at least one profile. Preferably the tube is flexible and more preferable the tube is resilient. By means of a flexible or resilient tube assembly a relative large contact area can be realised in an efficient manner.

In this regard it is preferred if the heat conductor covers at least 50 percent of an outer cross-sectional circumference of the conduit. In this configuration no further means are required for holding the conduit, such as the tube, in the heat conductor.

Preferably, the heat conductor is of a C-shaped cross-section along its length, which C-shape defines a chamber for receiving and holding therein the conduit. In this way a relative large contact area between the conduit, preferably a tube, and heat conductor is realised.

In this regard it is preferred if the conduit is formed by a resilient tube, wherein the C-shape is such that the tube can pass through the opening of the C-shape along the length of the heat conductor, in a deformed state of the tube. By doing so, the tube can be easily mounted in the chamber. Within the chamber, the tube is preferably in a non-deformed state but it may alternatively be in a, preferably slightly, deformed state. As a result, the tube will be held in place with respect to the heat conductor in a simple manner. In this configuration, the tube can for instance be mounted into the heat conductor in a snap-like manner.

Preferably the conduit is formed by a channel within the heat conductor itself, extending along the length of the heat conductor. Such a channel that is integral with the conductor reduces the number of parts of the panel-mounting system. In addition, the fluid is brought in direct contact with the heat conductor, thereby realizing a better heat transfer.

Preferably, the heat conductor has a thermal conductivity of at least 10 W/(m*K), (5.78 BTU/(hr*ft*F)).

In a preferred embodiment, the profile and the heat conductor are made of a material comprising aluminium such as an aluminium alloy such as an aluminium-magnesium-silicum, an aluminium-mangan or an aluminium-zinc alloy.

Preferably, the heat conductor is formed integral with the profile. Such an integral design reduces the number of parts of the panel-mounting system. In addition, the heat transfer from the panels to the heat exchanger is further enhanced.

Preferably, at least the profiles integral with the heat conductor are formed by extrusion. In another embodiment, the heat conductor and the profile are manufactured separately, preferably by extrusion, and then interconnected such as preferably by welding.

The panels are preferably fixed to the profiles in a releasable manner, preferably using fixing means such as rivets or screws. In an advantageous embodiment the part of the profile defining the contact area is provided with through holes for fixing the panels. Preferably said trough holes have a length extension passing sideways of the conduit so as to avoid to a large extent unintended damage to conduit while fixing the panels to the profiles such as preferably by riveting or screwing such as for example by self-tapping screws.

Preferably, the profile comprises a first limb and a second limb, whereby the first and second limbs extend under an angle of substantially 90 degrees with respect to each other, wherein the second limb defines the contact area and the heat conductor is connected at least to the second limb, and wherein the first limb is configured to be fixed to a wall of the building. The profile is thus L-shaped.

In order to increase the structural stability, it is preferred if the heat conductor is also connected to the first limb.

Preferably, the system further comprises a plurality of brackets configured to be directly fixed onto the building wall, in a mutually spaced apart configuration wherein each of the plurality of profiles is configured to be fixed to the wall by fixing it onto brackets of the plurality of brackets. This way, it is possible to realize a mutually parallel and flush arrangement of the profiles, positioned at a distance, for example in the range of 5 to 30 cm. (1.97 to 11.81 inches), preferably in the range of 10 to 20 cm. (3.94 to 7.87 inches), from the building wall. An unevenness of the wall can be compensated by the mutual connection between profiles and brackets.

In a second aspect the invention provides a method, as defined in claim 15, of providing a facade lining to a building wall, using a panel-mounting system according to the invention, the method comprising:

a) mounting the plurality of profiles together with the conduit to a wall of the building, b) fixing the panels to the profiles, preferably such that a an at least substantially continuous façade lining is created, c) forcing a fluid through the conduit of the system.

In a third aspect the invention provides a combination of parts, as defined in claim 18, for use in a system according to the invention, the parts of the combination comprising a conduit for a fluid, a plurality of elongate profiles which are each configured to be fixed to a wall of the building and which are each configured so that in use at least one panel of a plurality of panels for forming the façade lining of a building can be fixed thereto, thereby defining an elongate contact area between the profile and the at least one panel, which contact area extends along at least substantially the length of the profile, wherein some of the profiles comprise an elongate metallic heat conductor which is connected thereto, which extends at least substantially along the length of the profile, and which is arranged for in use exchanging heat conductively, through the contact area, between fluid in the conduit and the at least one panel fixed to that profile. Preferably, the plurality of panels is also included in said combination of parts.

The advantages of the method and combination of parts are analog to the above-mentioned advantages of the panel-mounting system according to the invention.

In a preferred embodiment of the method, for the purpose of step a), the plurality of profiles is mounted such that they mutually extend in parallel, and preferably in vertical direction.

It is further preferred if the conduit is formed by a tube that is in use connected to the heat conductor of at least one profile, wherein the method further comprises, before carrying out step b), connecting the tube to the heat conductor of at least some of the profiles such that the tube passes through at least some of the profiles as one single continuous part.

The present invention will be explained in more detail hereafter by the description of preferred embodiments of panel mounting systems according to the invention, with reference to the appended figures, in which:

FIG. 1 is a cross-section of a wall provided with a preferred embodiment of a panel-mounting system according to the present invention, FIG. 2 is, in cross section, detail II of FIG. 1, and FIG. 3 is, in cross section, a detail view of a further embodiment of a profile and conduit of a panel mounting system according to the present invention.

FIG. 1 shows a panel mounting system 1 for the façade lining of a building 3. The panel mounting system 1 is configured to be fixed onto a wall 10 of the building 3. The system 1 comprises a conduit 2 for transporting a fluid such as water. See also FIG. 2. The system 1 also comprises a plurality of elongate profiles 4 which are each configured to be fixed to the wall 10 of the building 3. Further, the system 1 comprises a plurality of panels 6, 6', 6" (further to be jointly referred to as panels 6) for forming the façade lining of the wall 10 of the building 3 by fixing the plurality of panels 6 onto the plurality of profiles 4.

Each of the profiles 4 has at least a first limb 26 and a second limb 28. The first and second limbs 26, 28 are orientated mutually perpendicular such that an L-shaped profile 4 is obtained. In an embodiment, the second limb may extend to beyond the first limb so as to obtain a T-shaped profile. An example of such a T-shaped profile is shown in FIG. 1 as profile 104. The second limb 28 is flat and defines an elongated contact area 7 between the profile 4 and a panel 6. The contact area 7 extends at least substantially along the length of the profile 4 (perpendicular to the sectional plane according to FIG. 1. In this respect it is noted that the length of the profile 4 may be considerable in comparison to the cross-sectional dimensions. The length of the profile 4 may be for example 2 or 4 meters (6.56 to 13.12 feet) or even longer, while the width of the limbs 26, 28 may be in the range of a few to about 20 cm. (7.87 inches).

At least some of the profiles 4 of the plurality of profiles comprises an elongated metallic heat conductor 5 which is connected to the profile 4. In the exemplary profile design of profile 4, the conductor 5 is welded onto the limbs 26, 28. In the figures only profile 4 is provided with such a heat conductor 5. A similar construction is possible with profiles 104 and 204 wherein it is noted that profile 204 is a mirror image of profile 4, at least in the view of FIG. 1. The various examples of profiles is only shown by way of example. A preferred embodiment of a system according to the invention comprises a plurality of profiles of the same cross-sectional shape and dimensions. The heat conductor 5 extends at least substantially along the length of the profile 4 and is arranged for exchanging heat conductively, through the contact area 7, between the fluid in the conduit 2 and the panel 6 which is fixed to the profile 4, in use of the system 1. Again, the same holds for profiles 104 en 204 onto which panels 6' and 6", respectively, are fixed.

The conduit 2 is formed by a tube that is in use connected to the heat conductor 5 of the profile 4. The heat conductor 5 is C-shaped and, as shown in FIG. 2, covers about 65 percent of the outer cross sectional circumference of the tube 2. The tube 2 is resilient such that the tube can be forced into a chamber 13 defined in the C-shaped conductor 5 through the opening of the C-shape. When in the chamber 13, the tube 2 returns to its original shape due to his resilient properties so that it is thereby positively held in the chamber 13.

In an alternative embodiment of a profile according to the invention, the conductor may be integral with the profile. This is shown in FIG. 3. FIG. 3 shows a profile 304 which is manufactured by extrusion. As it is shown, the conductor 305 is integral with the first and second limbs 326, 328 of the profile 304. A chamber 313 is created which is, similar to chamber 13 of C-shape so as to positively hold a conduit such as conduit 2 (not shown in FIG. 3) therein, In an alternative embodiment of a profile for use in a system according to the invention, the conduit is formed by a channel within the heat conductor itself, which channel extends along the length of the heat conductor. In such an embodiment, no separate conduit such as a tube is thus needed. The thermal conductivity of the heat conductor 5 and profile 4 is about 150 w/(M×K), (86.7 BTU/(hr*ft*F)), and they are made of an aluminum alloy.

The system 1 comprises a plurality of brackets 30 which are also L-shaped in cross-section and which are configured for fixing the profiles 4, 104, 204 (as shown in FIG. 1) to the wall 10. The brackets may be of similar length as the profiles, or may, preferably, be considerably shorter. This way, a single profile 4 can be fixed to the wall 10 for example by the use of two brackets per meter (3.12 feet) of the extension of the profile 4.

The brackets 30 are bolted on the wall 10 and are connected to the profiles 4 via bolts 24 passing through holes 22 in the first limb 26 of profile 4. The profile 4 is also provided with holes 16 in the second limb 28 for connecting the panel 6 to the profile 4, preferably using rivets like rivet 20. The brackets and profiles define a space 33 between the building wall 10 and the panels 6. Optionally, isolation material 32 may be provided in said space 33.

In a preferred embodiment of a method of providing a façade lining to a building wall 10 using a panel mounting system 1 as described above, firstly, the plurality of profiles 4 is mounted to a wall 10. This can be realized by mounting a plurality of profiles 4 to a wall 10 using brackets 30 such that for example ten individual profiles 4 are orientated in vertical direction, and mutually parallel at a distance from each other, such as 1 meter (3.28 feet), to the wall 10. Profiles 4 could be 5 meters long (16.40 feet). In case of a flat wall 10, the profiles 4 are mounted such that a continuous and also flat façade line can be realized. Within the scope of the present invention also non-flat façade linings can be realized, optionally with the use of non-flat panels 6.

Secondly, a conduit 2 such as a resilient rubber tube is provided, which conduit 2 is snapped into the C-shaped conductor 5 of a first one of the profiles 4 along the entire length of said profile 4. Then, a further part of the length of the conduit 2 is snapped into the conductor 5 of a neighboring profile 4. By doing so, in the end the conduit 2 makes a zig zag movement along all of the ten profiles 4. Alternatively, the conduit 2 may be snapped into the conductor 5 of a profile 4 prior to mounting said profile to the wall 10. If the entire length of conduit 2 is not sufficient, it can be increased by mutually coupling two individual lengths of conduit 2. A first and a second free end of the conduit 2, wherein the first end is upstream of the profiles 4 and the second end downstream of the profiles 4, can be connected to a source of fluid such as preferably a liquid such as water such that a water flow can be created through the conduit 2 to exchange heat via the conductor 5 to the panels 6. Next, the panels 6 are fixed to the profiles 4, such that a continuous façade lining is thereby created. The panels 6 can be fixed to the profiles 4 using riveting, or any other suitable connection. Then, a fluid is forced through the conduit 2 of the system 1. In case the panels 6 are of higher temperature than the fluid in the conduit 2, such as due to the exposure of the panels 6 to sun light, the fluid within the conduit 2 warms up and can be used for example as hot tap water or for heating purposes of the building 3. In case the panels 6 are of lower temperature than the fluid in the conduit 2, the system 1 can be used for any cooling purposes.

The invention claimed is:

1. A panel-mounting system for a façade lining of a building, comprising:
   a conduit for a fluid,
   a plurality of elongate profiles each having a length, which profiles are each configured to be fixed to a wall of the building,
   a plurality of panels for forming the façade lining of the building by fixing the plurality of panels onto the plurality of profiles, wherein for each of the profiles an elongate contact area is defined between the profile and at least one panel of the plurality of panels which is fixed to that profile, which contact area extends along at least substantially the length of the profile,
   wherein more than one of the plurality of profiles comprise an elongate metallic heat conductor which is connected to the profile, which extends at least substantially along the length of the profile, and which is arranged for exchanging heat conductively, through the contact area, between said fluid in the conduit and the at least one panel fixed to that profile.

2. The system according to claim 1, wherein the conduit is formed by a tube that is connected to the heat conductor of at least one profile.

3. The system according to claim 2, wherein the heat conductor covers at least 50 percent of an outer cross-sectional circumference of the tube.

4. The system according to claim 2, wherein the heat conductor is of a C-shaped cross-section along a length of said heat conductor, which C-shape defines a chamber for receiving and holding therein the tube.

5. The system according to claim 4, wherein the conduit is formed by a resilient tube, wherein the C-shape is such that the tube is capable of passing through the opening of the C-shape along the length of the heat conductor, in a deformed state of the tube.

6. The system according to claim 1, wherein the conduit is formed by a channel within the heat conductor, extending along a length of the heat conductor.

7. The system according claim 1 wherein the heat conductor has a thermal conductivity of at least 10 W/(m*K), (5.78 BTU/(hr*ft*F)).

8. The system according to claim 1 wherein the profile and the heat conductor are made of a material comprising aluminum.

9. The system according to claim 1 wherein the heat conductor is formed integral with the profile.

10. The system according to claim 9, wherein at least the profiles integral with the heat conductor are formed by extrusion.

11. The system according to claim 1 wherein the part of the profile defining the contact area is provided with through holes for fixing the panels.

12. The system according to claim 1 wherein the profile comprises a first limb and a second limb, wherein the first and second limbs extend under an angle of substantially 90 degrees with respect to each other, wherein the second limb defines the contact area and the heat conductor is connected at least to the second limb, and wherein the first limb is configured to be fixed to the wall of the building.

13. The system according to claim 12, wherein the heat conductor is also connected to the first limb.

14. The system according to claim 1 further comprising a plurality of brackets configured to be directly fixed onto the building wall, in a mutually spaced apart configuration wherein each of the plurality of profiles is configured to be fixed to the wall by fixing the profile onto brackets of the plurality of brackets.

15. A method of providing a façade lining to a building wall utilizing the panel-mounting system according to claim 1, the method comprising:
   a) mounting the plurality of profiles together with the conduit to the wall of the building,
   b) fixing the panels to the profiles, such that an at least substantially continuous said façade lining is created, and
   c) forcing the fluid through the conduit of the system.

16. The method according to claim 15, wherein for step a), the plurality of profiles is mounted such that the plurality of profiles mutually extend in parallel.

17. The method according to claim 15 wherein before carrying out step b), the tube is connected to the heat conductor of said more than one of the plurality of profiles such that the tube passes through said more than one of the a plurality of profiles as one single continuous part.

18. A combination of parts of the system according to claim 1, the parts of the combination comprising:
- the conduit for the fluid,
- the plurality of elongate profiles which are each configured to be fixed to the wall of the building,
- the plurality of panels configured for forming the façade lining of the building,
- wherein the profiles are each configured so that said at least one panel of the plurality of panels for forming the façade lining of the building are configured to be fixed thereto, thereby defining the elongate contact area between each said profile and the at least one panel of the plurality of panels fixed to that profile, which contact area extends along at least substantially the length of the profile, wherein said more than one of the plurality of profiles comprise the elongate metallic heat conductor which is connected thereto, which extends at least substantially along the length of the profile, and which is arranged for exchanging heat conductively, through the contact area, between fluid in the conduit and the at least one panel fixed to that profile.

* * * * *